(12) United States Patent
Chen et al.

(10) Patent No.: US 8,908,659 B2
(45) Date of Patent: Dec. 9, 2014

(54) METHOD AND APPARATUS FOR COEXISTENCE OF DIFFERENT BANDWIDTH SYSTEMS IN TV WHITE SPACE

(75) Inventors: Hou-Shin Chen, Cincinnati, OH (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 233 days.

(21) Appl. No.: 13/697,016

(22) PCT Filed: May 10, 2011

(86) PCT No.: PCT/US2011/035947
§ 371 (c)(1),
(2), (4) Date: Nov. 9, 2012

(87) PCT Pub. No.: WO2011/143234
PCT Pub. Date: Nov. 17, 2011

(65) Prior Publication Data
US 2013/0058247 A1    Mar. 7, 2013

Related U.S. Application Data

(60) Provisional application No. 61/333,596, filed on May 11, 2010, provisional application No. 61/333,432, filed on May 11, 2010, provisional application No. 61/398,220, filed on Jun. 22, 2010.

(51) Int. Cl.
*H04J 3/00* (2006.01)
*H04W 4/00* (2009.01)
*H04B 7/212* (2006.01)
*H04J 3/08* (2006.01)
*H04L 12/43* (2006.01)

(52) U.S. Cl.
USPC .......... 370/337; 370/314; 370/321; 370/326; 370/345; 370/442; 370/458; 370/498

(58) Field of Classification Search
CPC .............. H04W 88/187; H04W 74/04; H04W 72/0446; H04W 84/12; H04W 28/04; H04B 7/2643
USPC .......... 370/314, 336, 337, 345, 442, 458, 498
See application file for complete search history.

(56) References Cited

U.S. PATENT DOCUMENTS 6,980,587 B2   12/2005 Gesret et al.
2006/0245355 A1* 11/2006 Iwamura ....................... 370/232
(Continued)

FOREIGN PATENT DOCUMENTS

EP    1173931    11/2004
GB    2461724    1/2010
(Continued)

OTHER PUBLICATIONS

IEEE Standard, "Part II: Wireless LAN Medium Access Control (MAC) and Physical Layer (PHY) Specifications, Amendment 8: Medium Access Control (MAC) Qua," IEEE Standard for Information Technology; Telecommunications and Information Exchange Between Systems: Local.
Search Report dated Sep. 26, 2011.

*Primary Examiner* — Ronald Abelson
(74) *Attorney, Agent, or Firm* — Robert D. Shedd; Jeffrey M. Navon (57) ABSTRACT

Methods and apparatus of slot time synchronization for coexistence of 5 MHz, 10 MHz, and 20 MHz systems in TV white space are provided. The methods and apparatus extend concepts used in traditional 802.11 applications in the MAC layer so that networks that overlap in frequency and space can have access opportunities to TV white space channels. Several passive mechanisms are described which use bits of traditional 802.11 MAC Management Protocol Data Units to receive information related to the slot time of other overlapped networks. An active approach is described that uses measurements from a radio resource measurement service to adjust the slot time of stations in a network to that of the lowest bandwidth overlapped network in frequency and space.

8 Claims, 4 Drawing Sheets

(56) References Cited

U.S. PATENT DOCUMENTS

| | | |
|---|---|---|
| 2007/0002890 A1 | 1/2007 | Mangold et al. |
| 2007/0117537 A1 | 5/2007 | Hui et al. |
| 2008/0130519 A1 | 6/2008 | Bahl et al. |
| 2009/0268674 A1 | 10/2009 | Liu et al. |

FOREIGN PATENT DOCUMENTS

| | | | | |
|---|---|---|---|---|
| WO | WO9606490 | 2/1996 | | |
| WO | WO0065736 | 11/2000 | | |
| WO | WO2008144323 | 11/2008 | | |
| WO | WO 2011/054368 | * | 5/2011 | ............ H04W 72/04 |

* cited by examiner

Figure 1

Capability Information Field

Use B10 and B12 to indicate slot times: (B10 B12)
- ✓ (0 0): aSlotTime= 21 μs, aSIFSTime=64 μs
- ✓ (0 1): aSlotTime= 13 μs, aSIFSTime=32 μs
- ✓ (1 0): aSlotTime= 9 μs, aSIFSTime=16 μs
- ✓ (1 1): Reserved

Figure 2

| Name | |
|---|---|
| Basic request | 0 |
| Clear channel assessment (CCA) request | 1 |
| Receive power indication (RPI) histogram request | 2 |
| Reserved | 3 – 255 |

Figure 3

| BSS | OFDM Preamble | Unidentified Signal | Radar | Unmeasured | Different Bandwidth Network | Reserved (0) |
|---|---|---|---|---|---|---|

Bit:  0   1   2   3   4   5-6   7

Map field format of the basic measurement report

| | |
|---|---|
| 00 | No other dot11 networks |
| 01 | A 5 MHz network exists |
| 10 | A 10 MHz network exists |
| 11 | Reserved |

(a)

| (B5, B6) | Meaning |
|---|---|
| (0, 0) | A 5-MHz network exists |
| (0, 1) | A 10-MHz network exists |
| (1, 0) | Reserved |
| (1, 1) | Reserved |

Figure 8

METHOD AND APPARATUS FOR COEXISTENCE OF DIFFERENT BANDWIDTH SYSTEMS IN TV WHITE SPACE

CROSS-REFERENCE TO RELATED APPLICATIONS

This application claims the benefit, under 35 U.S.C. §365 of International Application PCT/US2011/035947, filed May 10, 2011, which was published in accordance with PCT Article 21(2) on Nov. 17, 2011 in English and which claims the benefit of U.S. provisional patent applications Nos. 61/333,596, filed May 11, 2010; 61/333,432, filed May 11, 2010 and 61/398,220, filed Jun. 22, 2010.

FIELD OF THE INVENTION

The present principles relate to a method and apparatus for coexistence of different bandwidth systems in TV white space that use unoccupied television spectrum.

BACKGROUND OF THE INVENTION

Recently, the Federal Communications Commission (FCC) has approved the operation of unlicensed radio transmitters in the broadcast television spectrum at locations where that spectrum is not being used by licensed services, such as television stations and wireless microphone operators, under certain rules. This unused TV spectrum is often termed "white spaces". A concept called Cognitive Radio was proposed to implement negotiated, or opportunistic, spectrum sharing to improve spectrum efficiency for these frequencies.

It can be expected that the implementation of Cognitive Radio (CR) in TV white space will be a major topic within wireless communication into the future and provide a viable solution to the problem of scarcity of the wireless spectrum. In 2004, based on the expectation of unlicensed use of TV white space, under the charter of an IEEE 802 Standards Committee, a working group named IEEE 802.22 was established to develop a standard for a Cognitive Radio-based PHY/MAC/air interface for use by license-exempt devices on a non-interfering basis in spectrum that has already been allocated to the TV Broadcast Service. The IEEE 802.22 working group is also called the WRAN Group, since it is essentially developing an air interface for a Wireless Regional Area Network (WRAN) with a range as large as 30 miles.

An alternate idea is to standardize the use of this spectrum to provide services similar to that of the traditional IEEE 802.11 WiFi standard. This effort to use TV white space for WiFi access is known as 802.11af. The difference between the traditional 802.11 standards and 802.11af is that 802.11af will be for WiFi operation in the TV white spaces.

TV white space (TVWS) consists of fragments of TV channels. Thus, depending on the usage of TV broadcasting and wireless microphones, the spectrum opportunity may be 6 MHz, 12 MHz, 18 MHz, . . . assuming that a TV channel is 6 MHz wide. In addition, the spectrum opportunity may happen in any of the TV bands. Thus, the spectrum opportunity in TVWS differs from the traditional 802.11 bands of 2.4 GHz, 3.6 GHz and 5 GHz in that the center frequency and channel bandwidth are variable. Neighboring networks are those which overlap in frequency and space. Under the present principles, methods and apparatus for coexistence of neighboring networks with different bandwidths in TV white space for WiFi access are described.

SUMMARY OF THE INVENTION

The coexistence of TV band devices in TV white space are addressed by the present principles, which are directed to methods and apparatus for enabling access opportunity to the TV white space medium for different bandwidth systems. Using the principles described herein, access to the TV white space medium is provided by synchronization of the slot time for 5 MHz, 10 MHz, and 20 MHz neighboring networks. Neighboring networks are those that overlap in frequency and space. Different bandwidth devices will have different slot times, which will cause some longer slot time devices to continue to wait for an idle channel while shorter slot time devices gain access to the medium.

According to an aspect of the present principles, there is provided a method for enabling access opportunity to the TV white space medium for different bandwidth systems that overlap in frequency and space. The method comprises receiving information from at least one of a plurality of first networks, and setting a slot time for a station of a second network according to the information received from at least one device from at least one of a plurality of first networks.

According to another aspect of the present principles, there is provided a method for enabling access to a medium in TV white space, comprising requesting information related to bandwidth of other networks from a measurement service, receiving information related to the bandwidth of other networks from the measurement service, and modifying a station's slot time to be equal to that of one of the other networks with a lower bandwidth based on the received information related to bandwidth by setting one or more bits to indicate the modified slot time.

According to another aspect of the present principles, there is provided an apparatus for enabling access to a medium in TV white space, comprising a receiver for receiving information from at least one of a plurality of first networks, and a processor that sets a slot time for a station of a second network according to the information received from at least one of a plurality of first networks.

According to another aspect of the present principles, there is provided an apparatus for enabling access to a medium in TV white space, comprising a network interface manager that requests information related to bandwidth of other networks from a measurement service and that receives information related to the bandwidth of other networks from the measurement service, and a processor to modify a station's slot time to be equal to that of one of the other networks with a lower bandwidth based on the received information related to bandwidth by setting one or more bits to indicate the modified slot time.

These and other aspects, features and advantages of the present principles will become apparent from the following detailed description of exemplary embodiments, which is to be read in connection with the accompanying drawings.

DETAILED DESCRIPTION

Recently, based on the approval of the FCC, unlicensed radio transmitters can utilize the broadcast television spectrum at locations where that spectrum is not being used by licensed services, according to IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007. This unused TV spectrum is often termed "TV white space". The charter of the IEEE 802.22 working group is to develop a standard for a cognitive radio-based PHY/MAC/air interface for use by license-exempt devices on a non-interfering basis in spectrum that is allocated to the TV Broadcast Service. Another group, the 802.11af group, is standardizing use of TV white spaces for services traditionally provided by the 802.11 WLAN standard. The IEEE 802.11af group is significant because there are already a tremendous number of 802.11 devices in the market. Under the principles described herein, we describe approaches regarding the coexistence of networks that overlap in space and frequency that compete for the same medium access opportunity.

The fundamental access method of the IEEE 802.11 Medium Access Control (MAC) is a Distributed Coordination Function (DCF) known as Carrier Sense Multiple Access with Collision Avoidance (CSMA/CA). It is a distributed system while most of other systems such as IEEE 802.16 and IEEE 802.22 are centralized systems. As a result, it is difficult to design "a common MAC (coexistence scheme)" for 802.11 and other 802 wireless systems. The coexistence of heterogeneous systems can be achieved by a centralized control machine or through distributed resource contention method. Both have advantages and disadvantages. For a centralized coexistence mechanism, synchronizations of various IEEE and non-IEEE wireless systems over a wide area is a crucial control problem. The 802.11af group uses a DCF access function for its MAC layer.

Figure 1:
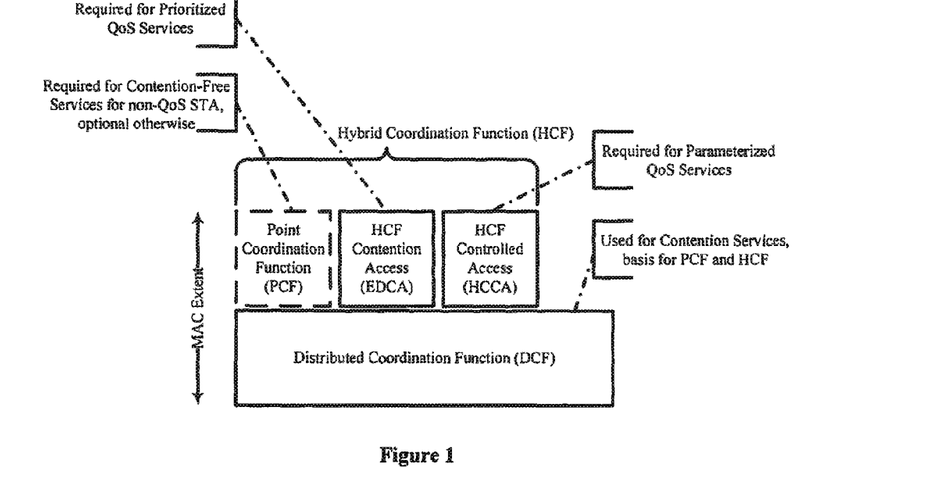
FIG. 1 shows the IEEE 802.11 MAC architecture.

The basic 802.11 MAC layer employs Distributed Coordination Function (DCF) with enhanced distributed channel access (EDCA) mechanism to compete for wireless medium. FIG. 1 (from IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007) illustrates the IEEE 802.11 MAC architecture. The basic MAC rule is that DCF and Hybrid Coordination Function (HCF) are provided through the services of the DCF to support Quality of Service (QoS). The Point Coordination Function (PCF) is a centralized mechanism and it is seldom used. The HCF uses both a contention-based channel access method, called the EDCA mechanism for contention-based transfer, and a controlled channel access, referred to as the HCF controlled channel access (HCCA) mechanism, for contention-free transfer.

The EDCA mechanism provides differentiated, distributed access to the wireless media for stations (STAs) using eight different user priorities (UPs). It defines four access categories (ACs) that provide support for the delivery of traffic with UPs at the STAs. The four ACs and their corresponding parameters are listed in Table 1. In Table 1, TXOP refers to transmission opportunity. It is the time that a station has the right to transmit on the channel, limited by TXOPLimit. An initiation of the TXOP occurs when a STA obtains access to the medium through DCF. Multiple frames may be transmitted in an acquired TXOP if there is more than one frame pending in the AC for which the channel has been acquired. However, those frames that are pending in other ACs shall not be transmitted in this TXOP.

TABLE 1

| Access Category | Background | Best Effort | Video | Voice |
|---|---|---|---|---|
| AIFSN | 7 | 3 | 2 | 2 |
| CWmin | 15 | 15 | 7 | 3 |
| CWmax | 1023 | 1023 | 15 | 7 |
| TXOPLimit(ms) | 0 | 0 | 3.008 | 1.504 |

The EDCA mechanism is suitable to facilitate a coexistence problem. Every system acquires the wireless medium for a period of time through DCF. DCF is a protocol that senses carriers and uses acknowledgements, with optional use of RTS/CTS (Request to Send/Clear to Send) packets. Most of the existing 802.11 systems use DCF as their MAC function. Every STA utilizing equal channel bandwidths will have the same channel access opportunity. When a STA gets a chance to use the wireless medium, it can transmit a frame. The size of a frame depends on the data rate used by this STA. A frame of an STA with low data rate is longer. Consequently, low-rate transmissions will consume more channel time.

Based on the FCC Second Report and Order of November 2008, TV channels 2-51 except channels 3, 4 and 37, can be used for radio transmissions provided that the incumbent licensed signals, i.e., TV broadcast and wireless microphone (WM) signals, are not interfered. Thus, the spectrum opportunity in TVWS consists of fragments of single or multiple TV channels (TVCs). The size of the each fragment can vary from 1 TVC to several TVCs. It has been shown that even in urban areas, a fragment can have as many as four contiguous TVCs. In rural areas, fragments of up to 16 TVCs are possible. Basically, more channel bandwidth means higher data rate and smaller data packet sizes. Having a small data frame is important for a CSMA system.

The spectrum opportunities in TVWS can be classified into two categories, which are contiguous and non-contiguous.

In the first case, the available TVCs are contiguous. For example, four contiguous TVCs may be used. Ideally, the larger the channel bandwidth, the higher the data rate, so from this point of view, a system should use as many available TVCs as possible. Obviously, a practical system cannot support an infinite number of channel bandwidths. In the second case, the available TVCs are non-contiguous. When the available TVCs are not contiguous but close to each other, we still want to use them together to increase data rate and have small packet sizes. The CSMA-based systems compete for the medium. Different systems see each other when the TVCs used are overlapped in space and frequency.

TV White Space devices may employ three different channel bandwidths. They may use 5 MHz, 10 MHz, or 20 MHz bandwidths corresponding to 1, 2, and 4 contiguous available TV channels. In a region where competing Wireless Local Area Networks (WLANs) exist, there may be several neighboring 802.11af networks using different bandwidths which overlap in space and frequency. For example, a 10 MHz network may operate in Channels 20 and 21 in the same area that a 5 MHz network operates in Channel 20.

The parameters aSlotTime and aSIFSTime are DCF MAC parameters within the 802.11 WLAN standard. The parameter aSlotTime defines a time interval, a multiple of which a transmitter waits before transmitting data. The parameter aSIFSTime defines a short interframe space time, during which a receiver must send an acknowledge signal back to a transmitter. According to Table 2, aSlotTime and ASIFSTime are different for different channel bandwidths. Networks with longer slot times will get much less medium access opportunity than networks with shorter slot times, because the shorter slot time devices will begin transmitting on an idle channel while the longer slot time devices are still waiting to transmit. Therefore, in the example above, the 5 MHz network operating in Channel 20 will have less access opportunity than the 10 MHz network operating in Channels 20 and 21.

TABLE 2

| Parameter | 20 MHz | 10 MHz | 5 MHz |
|---|---|---|---|
| aSlotTime | 9 μs | 13 μs | 21 μs |
| aSIFS Time | 16 μs | 32 μs | 64 μs |

In a CSMA/CA system, a station attempts to sense other transmitting stations before attempting to transmit data. If the station does not detect other stations transmitting, it will wait an interval of time before sending its data, then wait for an acknowledgement from a receiving station. If an acknowledgement is not received, the transmitter waits for a period of time, verifies that the channel is clear, and then will attempt to resend its data.

The transmitted data that is sent include information related to the time that the transmitter expects to occupy the channel sending its information. Other stations in the network obey this time, and do not transmit during this interval.

A station waits for a channel to appear idle for a period known as the DCT Interframe Space (DIFS). If the channel was active, the station waits for the DIFS period, plus a random number of slot times, called the contention window (CW). This random number is different for different stations in the network, so that if two stations are waiting to transmit, they will not transmit together at the same time. For example, after a channel appears idle, and after waiting the DIFS time period, one station may wait n slot times to transmit, while another station may wait m slot times to transmit. If a transmitting station senses that a channel is still active, it will wait for a longer contention window period.

One problem with this approach is that, if a channel is busy, the data transfer time increases as transmitting stations increase their contention window looking for an idle channel.

A second problem arises as a result of networks that overlap each other and that use different bandwidths, such as those that exist for TV White Space devices. In a mixed bandwidth region, the slot times for each device depends on the bandwidth that their own network uses. Network devices with longer slot times will get much less medium access opportunity than the devices in networks with shorter slot times. The data transfer times can increase for narrow bandwidth devices, which employ longer slot times than competing wider bandwidth devices in overlapping frequency and space.

Under the principles presented herein, an idea called dynamic slot time adaptation is described, which attempts to equalize the opportunities for medium access in networks overlapped in frequency and space. As a result of equalizing the medium access opportunities, better throughput performance is achieved across the entire region where the networks operate.

Dynamic slot time adaptation is proposed under the present principles, using one or both of a passive and an active mechanism. The passive mechanism sets slot times according to slot time information contained in beacon, probe response, association response, and reassociation response messages received from other networks. The active mechanism sets slot times according to radio measurement results.

Figure 2:
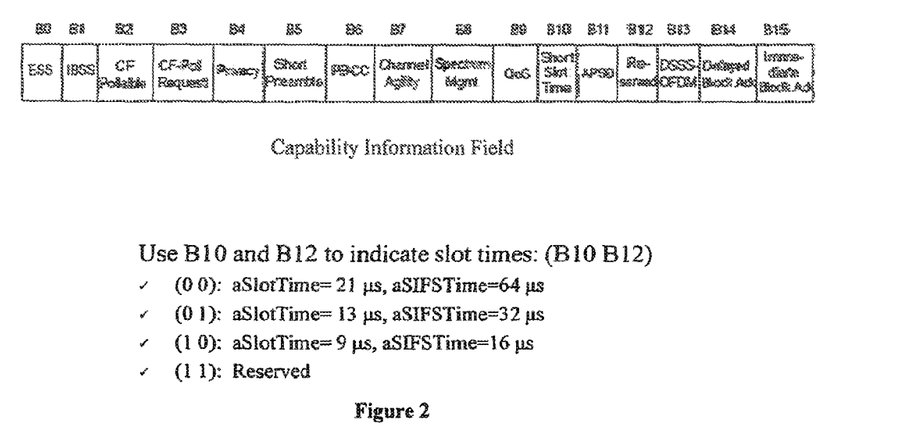
FIG. 2 shows the structure of a Capability Information Field and example usage of its bits to indicate slot time.

Some of the variables necessary for operation of 802.11 systems are included within a Management Information Base, as specified in Annex D of the 802.11 standard. The Management Information Base is a virtual database for managing the devices in a communications network. The Capability Information field is a 16-bit value included in a network Access Point's (AP) beacon transmissions to announce the capabilities of the network. One of the bits, B10, is used in non-TVWS operation, such as in the 802.11g standard, to indicate if Short Slot Time is used. This bit is not normally used for this purpose in 802.11af applications. Additionally, B12 is a reserved bit. Under the principles presented herein, these two bits are used to indicate the slot time of a network so that a transmitting station of a different overlapped network can adjust its own slot time accordingly. One example of using these bits for a network's slot time is indicated in FIG. 2, where the two bits (B10,B12) indicate values of slot times and Short Interframe Space (SIFS) times corresponding to 5 MHz, 10 MHz, and 20 MHz. Upon receipt of these values, from a beacon transmission for example, a station would modify its own slot time and/or SIFS time to enable opportunities to access the medium for all stations. The station accomplishes this by setting its MAC variables aSlotTime and aSIFSTime to the corresponding values indicated by the Capability Information field's B10 and B12 bits, for example, upon reception of a beacon, probe response, association response, or reassociation response from other 802.11 networks that overlap the station.

The aSlotTime and aSIFSTime listed in FIG. 2 are currently used in OFDM PHY for 5, 10, 20/40 MHz channel spacing from top to bottom. These two parameters are related to aRxTxTurnaroundTime which is related to the coverage range. The coverage range of 802.11 devices could be larger in TVWS due to less propagation loss. Thus, the aSlotTime and aSIFSTime may be changed, and FIG. 2 is one example.

Another embodiment of these principles may be achieved by using different bits to set aSlotTime and aSIFSTime for an 802.11af station. The two bits used in this embodiment can be called dot11SlotTimeOptionSelection(1:0), for example, and would be set to the bits found in the Management Information Base attributes dot11ShortSlotTimeOptionImplemented and dot11ShortSlotTimeOptionEnabled upon reception of a beacon, probe response, association response, or reassociation response MAC Management Protocol Data Unit (MMPDU) from an existing 802.11 network that overlaps the 802.11af network. Then, as in the first example, the 802.11af station would set its MAC variables aSlotTime and aSIFSTime to the bits defined as dotSlotTimeOptionSelection(1:0), which were determined from the bits of dot11ShortSlotTimeOptionImplemented and tdot11ShortSlotTimeOptionEnabled.

Stations shall set the Slot Time subfield according to their current aSlotTime and aSIFSTime in use in transmitted Association Request, Reassociation Request, DLS Request, and DLS Response MMPDUs when the MIB attribute dot11SlotTimeOptionImplemented and dot11SlotTimeOptionEnabled are true. Otherwise, the STA shall set the Slot Time subfield to (0, 0) in transmitted Association Request and Reassociation Request MMPDUs to inform that it does not support Slot Time adaptation and uses the longest slot time option.

If a STA does not support Dynamic Slot Time adaptation, the AP shall use the longest slot time option beginning at the first Beacon subsequent to the association of the STA that does not support Slot Time adaptation. APs shall set the Slot Time subfield in transmitted Beacon, Probe Response, Association Response, and Reassociation Response MMPDUs to indicate the currently used slot time value within this network.

Stations shall set the MAC variables aSlotTime and aSIFSTime to the corresponding values indicated by the Slot Time subfield upon transmission or reception of Beacon, Probe Response, Association Response, and Reassociation Response MMPDUs from the network that the STA has joined or started when the MIB attribute dot11SlotTimeOptionImplemented is true. STAs shall set the MAC variables aSlotTime and aSIFSTime to the longest option at all times when the MIB attribute dot11SlotTimeOptionImplemented is false. When the dot11SlotTimeOptionImplemented MIB attribute is not present, or when the PHY layer supports only a single slot time value, then the STA shall set the MAC variables aSlotTime and aSIFSTime to the values appropriate for the attached PHY layer.

Figure 3:
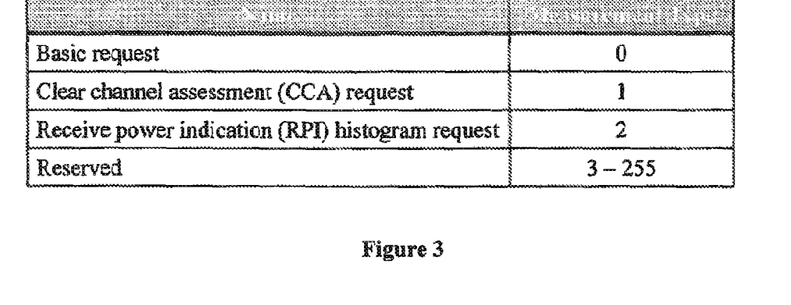
FIG. 3 shows measurement type definitions for measurement reports.
Figure 4:
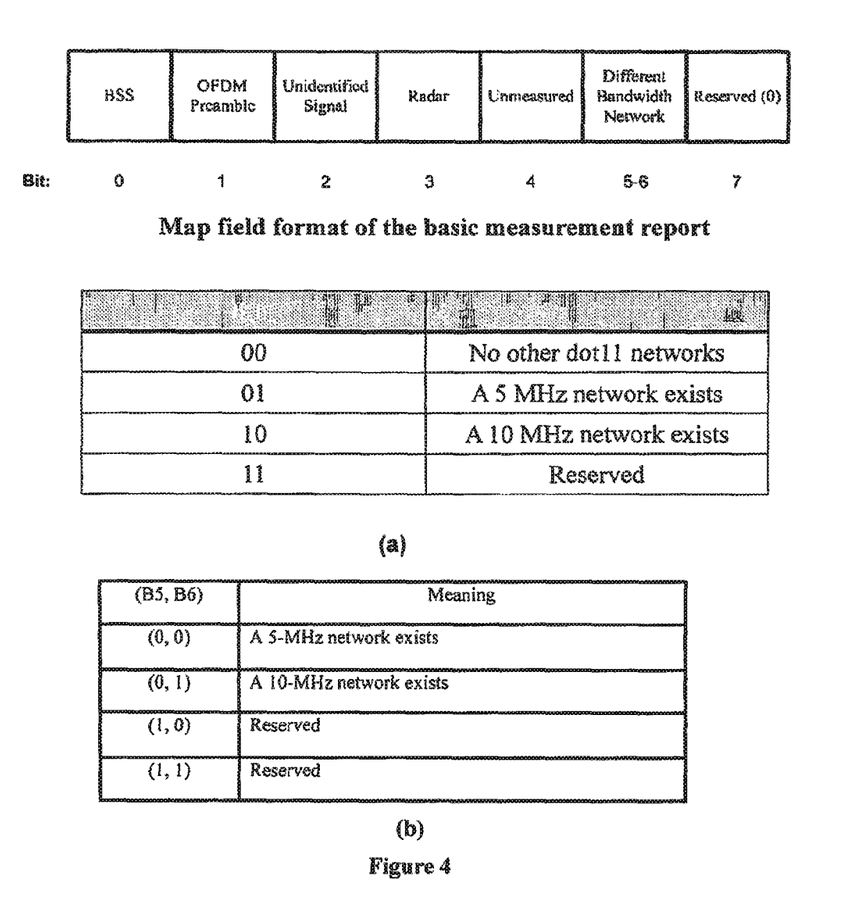
FIG. 4 shows the Map field format of a basic measurement report.

An embodiment to achieve slot time synchronization for coexistence of 5 MHz, 10 MHz, and 20 MHz systems using an active mechanism is also possible. One way to accomplish this using the present principles is to identify the existence of other neighboring networks of different bandwidth, for example by using the 802.11 radio resource measurement service, which is defined in IEEE 802.11k. Currently, the 802.11k measurement service provides basic measurements and configuration data for stations and basic monitoring of global Access Point (AP) statistics. Stations may request measurements from other stations to determine the degree to which a frequency spectrum is occupied. The results are sent back to a requesting station using a standardized format. FIG. 3 shows the measurement type definitions for the measurement reports. The detection of 802.11 networks with different bandwidths can be included in the Basic request, with Measurement Type 0. FIG. 4 shows the map field format of the basic measurement report. Bits 5-7 are currently reserved bits. Under the principles presented herein, two of these three reserved bits in the Map field for the basic measurement report may be used to indicate the existence of 802.11 networks of different channel bandwidths. One example is shown in FIG. 4(*a*), showing an example using bits 5 and 6 to convey the information regarding other networks. In this example, a two bit value of 00 is used to signal that no other 802.11 networks are in existence. A value of 01 means that a 5 MHz network exists, and a value of 10 is used when a 10 MHz network exists. This information is sent back to a requesting station. A similar example is shown in FIG. 4(*b*) with values of 00 and 01 indicating the presence of 5 MHz and 10 MHz networks, respectively.

The requesting station uses this information to adjust its own slot time, depending on its own bandwidth. A 5 MHz network station does not need to perform measurement since it cannot change its slot times. It already uses the longest available slot times. A 10 MHz network should measure if there is a 5 MHz network in the region and adjust its slot time accordingly, that is, to the slot time of the 5 MHz network. A 20 MHz network should measure if there is a 10 MHz network or a 5 MHz network and adjust its slot times to the one used by a network that was found having the smallest bandwidth.

Each of the two parallel mechanisms, the passive approach and the active approach, may be used to synchronize the slot times for 802.11 networks which overlap in frequency and space. Two examples of the passive approach have been described. The first uses the slot time information included in the Capability Information field and the Management Information Base to support dynamic slot time selection. The second example proposes using bits called dot11SlotTimeOptionSelection for adjusting 802.11af systems' slot times. The dot11ShortSlotTimeOption Implemented bit and the dot11ShortSlotTimeOptionEnabled bit of the 802.11 WLAN standard can be used for dot11SlotTimeOptionSelection to indicate selection of aSlotTime and aSIFSTime for 802.11af applications.

The active mechanism of dynamic slot time adaptation measures the existence of other nearby 802.11 networks with different bandwidths by including this information in the basic request of the 802.11 radio resource measurement service. In this case, the reserved bits of the Map field of the basic measurement report are used to indicate the existence of other 802.11 networks with different bandwidths.

The active and passive methods may be used alone or in some combination to adjust the 802.11af slot times. For each of these approaches, all overlapping 802.11 networks will then use the same slot times to enable access to the wireless medium for each device. A further embodiment of the present principles is to synchronize the slot times of all devices to the longest slot time, so that all devices have access to the medium without measurements or further adjustments.

Figure 5:
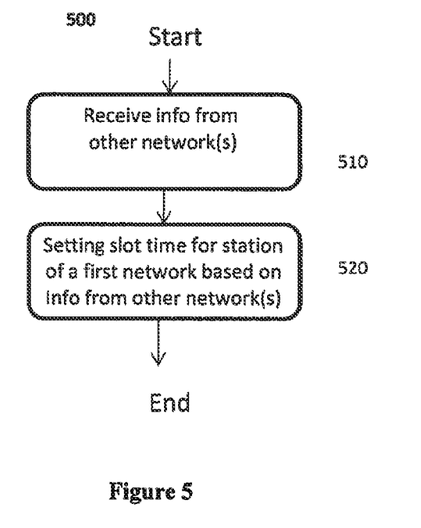
FIG. 5 shows an embodiment of a method for enabling access opportunity to a medium under the present principles.

One embodiment of the present principles is shown in FIG. 5, which shows a method for enabling access to a medium in TV white space, 500. The method begins by receiving information from at least one other neighboring network device in step 510. This information is received, for example, from the Capability Information Field or in Management Information Base attributes dot11SlotTimeOptionImplemented and dot11SlotTimeOptionEnabled. Following reception of this information, the slot time is set for a station of a first network based on the information received from at least one other network in step 520. Setting of the slot time causes the station to wait for a time period related to a multiple of slot times before transmitting data in TV white space.

Figure 6:
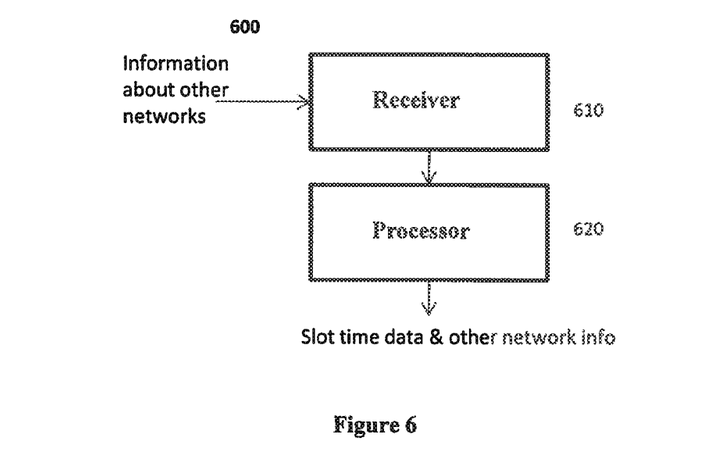
FIG. 6 shows an embodiment of an apparatus for enabling access opportunity to a medium under the present principles.

A further embodiment of the present principles is shown in FIG. 6, which shows an apparatus for enabling access to a medium in TV white space, 600. The apparatus is comprised of a receiver 610 for receiving information about at least one other neighboring network. This information is received, for example, from the Capability Information Field or in Management Information Base attributes dot11SlotTimeOptionImplemented and dot11SlotTimeOptionEnabled. The output of receiver 610 is sent to the input of processor 620, which sets the slot time of a station in the network. A timer can then send an output signal to the input of a transmitter to inform the transmitter that the slot time has elapsed. The transmitter can then sends its input data into the medium in TV white space.

Figure 7:
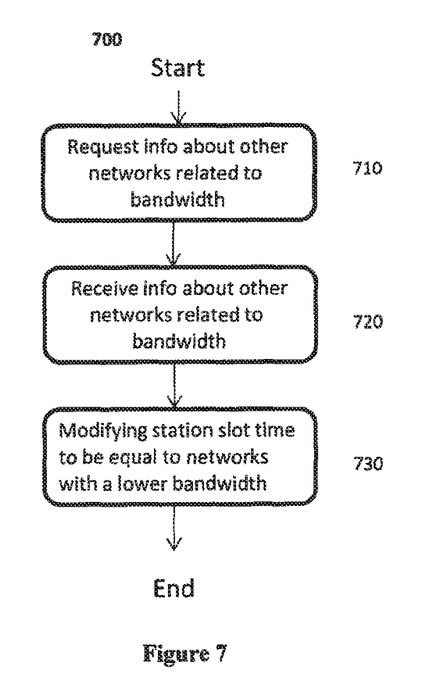
FIG. 7 shows an embodiment of a method for enabling access opportunity to a medium under the present principles.

Another embodiment of the present principles is shown in FIG. 7, which shows a method for enabling access to a medium in TV white space, 700. The method begins by requesting information about other networks related to bandwidth in step 710. This request can be made, for example, to the 802.11 radio resource measurement service through a basic measurement request message, as shown in FIG. 3.

Next, the information related to bandwidth of other neighboring networks is received, from the 802.11 radio resource measurement service, for example, in step 720. The slot time of a station in the network is modified in step 730 so that it is equal to the slot time of one of the neighboring networks, if there is one with a lower bandwidth. This modified slot time information is used to wait for a time period related to a multiple of slot times if the channel is idle before transmission of data in TV white space.

Figure 8:
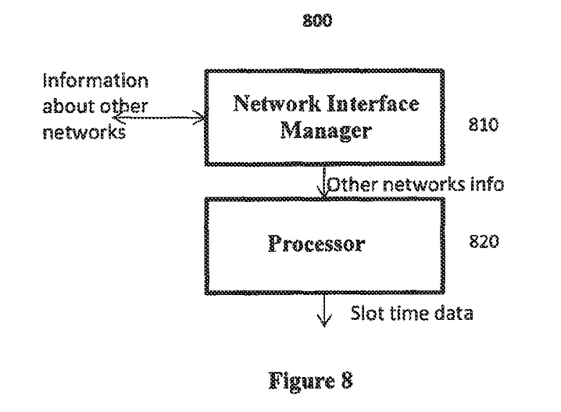
FIG. 8 shows an embodiment of an apparatus for enabling access opportunity to a medium under the present principles.

Another embodiment of the present principles is shown in FIG. 8, which shows an apparatus for enabling access to a medium in TV white space, 800. The apparatus is comprised of a network interface manager, 810, that requests and then receives information about other neighboring networks. The information can be requested from, and received from, the 802.11k radio resource measurement service, for example. The network interface manager 810 outputs this information to the input of processor, 820. Processor 820 sets the slot time data, and perhaps other network information, for a station in the network. A timer can generate an output signal if the channel is idle and the slot time has elapsed. A transmitter will then transmit the data on its input to the TV white space medium.

One or more embodiments have been described that enable access to a medium in TV white space through dynamic slot time synchronization. The embodiments enable stations in networks that are overlapped with neighboring networks of different bandwidths to have access opportunity to the medium in TV white space. Various embodiments of a passive approach to dynamic slot time synchronization have been described. Also, an active approach to dynamic slot time synchronization has been described that uses, for example, the 802.11 radio resource measurement service. Consistent access opportunities to a medium in TV white space for all devices generally allows an improved throughput throughout the wireless region.

We thus provide one or more implementations having particular features and aspects. However, features and aspects of described implementations may also be adapted for other implementations. For example, these implementations and features may be used in the context of other wireless networks or systems. The implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications. Examples of such equipment include an encoder, a decoder, a web server, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may use all or part of the approaches described herein. The implementations may include, for example, instructions for performing a method, or data produced by one of the described embodiments.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method for enabling access by a device in a network to a medium in TV white space, comprising:
   requesting information related to bandwidths of devices on a neighboring network from a measurement service;
   receiving information related to said bandwidths of devices in the neighboring network from said measurement service;
   modifying a station's slot time to be equal to that of one of said other networks with a lower bandwidth based on said received information related to bandwidth by setting one or more bits to indicate said modified slot time.

2. The method of claim 1 wherein said measurement service comprises an 802.11 radio resource measurement service.

3. The method of claim 1 wherein said requesting step comprises sending a 802.11 basic measurement request; and wherein said receiving step comprises receiving a 802.11 basic measurement report.

4. The method of claim 3 wherein data in Map field of basic measurement report indicate existence of 802.11 networks of different channel bandwidths.

5. An apparatus for enabling access by a device in a network to a medium in TV white space, comprising:
- a network interface manager that requests information related to bandwidths of devices on a neighboring network from a measurement service and that receives information related to said bandwidths of devices in the neighboring network from said measurement service;
- a processor to modify a station's slot time to be equal to that of one of said other networks with a lower bandwidth based on said received information related to bandwidth by setting one or more bits to indicate said modified slot time.

6. The apparatus of claim 5 wherein said measurement service comprises an 802.11 radio resource measurement service.

7. The apparatus of claim 5 wherein said network interface manager sends a basic measurement request; and receives a basic measurement report.

8. The apparatus of claim 7 wherein two reserved bits in Map field of basic measurement report indicate existence of 802.11 networks of different channel bandwidths.

* * * * *